United States Patent
Roman (10) Patent No.: US 6,948,891 B2
(45) Date of Patent: Sep. 27, 2005

(54) DRILLING TOOL SET, DRILLING TOOL AND INDEXABLE DRILL BIT THEREFOR

(75) Inventor: Stefan Roman, Kungsgården (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 10/446,728

(22) Filed: May 29, 2003

(65) Prior Publication Data

US 2003/0223833 A1 Dec. 4, 2003

(30) Foreign Application Priority Data

May 29, 2002 (SE) .............................................. 0201588

(51) Int. Cl.⁷ .............................................. B23B 51/02
(52) U.S. Cl. ........................ 408/223; 408/230; 408/233; 408/713; 407/113
(58) Field of Search .......................... 407/113; 408/223, 408/224, 227, 229, 230, 233, 713

(56) References Cited

U.S. PATENT DOCUMENTS

| | | | | |
|---|---|---|---|---|
| 4,645,384 A | * | 2/1987 | Shimomura et al. | 407/42 |
| 4,648,760 A | * | 3/1987 | Karlsson et al. | 408/223 |
| 4,889,455 A | * | 12/1989 | Karlsson et al. | 408/188 |
| 5,049,011 A | * | 9/1991 | Bohnet et al. | 408/223 |
| 5,429,458 A | * | 7/1995 | Tukala et al. | 408/223 |
| 5,503,509 A | * | 4/1996 | von Haas et al. | 408/188 |
| 5,505,569 A | * | 4/1996 | Gustafsson et al. | 407/113 |
| 5,622,461 A | * | 4/1997 | Tukala et al. | 408/224 |
| 5,758,997 A | * | 6/1998 | Mealey et al. | 408/224 |
| 5,800,100 A | * | 9/1998 | Krenzer | 408/224 |
| 5,827,016 A | * | 10/1998 | Strand | 407/115 |
| 5,971,676 A | | 10/1999 | Kojima | |
| 6,039,515 A | * | 3/2000 | Lamberg | 408/188 |
| 6,196,771 B1 | * | 3/2001 | Andersson | 407/113 |

FOREIGN PATENT DOCUMENTS

JP 01321101 A * 12/1989 ........... B23B/27/14

* cited by examiner

*Primary Examiner*—Derris H. Banks
*Assistant Examiner*—Michael W Talbot
(74) *Attorney, Agent, or Firm*—Burns, Doane, Swecker & Mathis, LLP (57) ABSTRACT

A drilling tool set includes a plurality of drilling tools having different operative drill diameters to blast drill holes of different respective diameters. Each drilling tool of the set has a basic body defining a central axis of rotation, and two replaceable indexable bits including a center bit and a periphery bit which are mountable in respective center and periphery pockets formed in a front end of the basic body. The periphery bits of the respective drill tools of the set are identical, and the center bits of the respective drill tools of the set are identical. Each of the center and periphery pockets of each drill tool defines a radial center point. A first of the drill tools has a smaller operative drill diameter than a second of the drill tools. The first tool includes a first periphery pocket and a center pocket. The center point of the first periphery pocket is disposed closer to the axis than is the center point of the second periphery pocket. The center point of the first center pocket is disposed closer to the axis than is the center point of the second center pocket.

17 Claims, 5 Drawing Sheets

DRILLING TOOL SET, DRILLING TOOL AND INDEXABLE DRILL BIT THEREFOR

This application claims priority under 35 U.S.C. §§119 and/or 365 to Patent Application Serial No. 0201588-1 filed in Sweden on May 29, 2002, the entire content of which is hereby incorporated by reference.

TECHNICAL FIELD OF THE INVENTION

In a first aspect, this invention relates to a drilling tool set of the type that comprises a plurality of drilling tools or drills having different operative drill diameters in order to enable the blast-drilling of holes having different diameters. The individual drilling tool of the set comprises, on one hand, a basic body rotatable around a central geometric axis, and on the other hand two replaceable and indexable bits in the form of a center bit and a periphery bit, which are mountable in pockets formed in a front end of the basic body, more precisely a center pocket in connection with said center axis and a periphery pocket in connection with the periphery of the basic body, respectively. The drilling tool set includes similar center bits and similar periphery bits for all the different basic bodies included in the tool set. The different operative drill diameters of the drilling tools are effected by the fact that the periphery pockets of the basic bodies are located at different radial distances from the center axis, viz., in such a way that the periphery pocket in a basic body for a certain drill diameter is located at a greater radial distance from the center axis than an analogous periphery pocket in a basic body for a smaller drill diameter.

In a second aspect, the invention relates to an individual drilling tool as such. In a third aspect, the invention also relates to an indexable drill bit for such drilling tools.

BACKGROUND OF THE INVENTION

Drills of the type to which the invention relates, and which by those skilled in the art are denominated short hole drills, are most commonly used for blast drilling of holes in workpieces of metal, such as steel, aluminum or the like. However, the drills may also work in other materials than metal.

Generally, the drills include a basic body as well as two bits, which are detachably mounted in pockets in the front end or tip of the basic body. Usually, the basic body is formed with a rear fastening part and a front, long narrow shank of a cylindrical basic shape. In the shank, two chip channels are formed, which advantageously extend helicoidally rearwards from the bits, which consist of on one hand a center bit which may be received in a center pocket positioned in the immediate vicinity of the geometrical center axis of the shank, and on the other hand a periphery bit which is mountable in a periphery pocket in the immediate vicinity of the peripherical envelope surface of the shank. Said bits are located substantially diametrically opposite each other on both sides of the geometrical center axis and arranged so that the operating ranges for their operative cutting edges overlap each other. More precisely, in the workpiece, the center bit is arranged to machine a circular area, the outer diameter of which is somewhat larger than the inner diameter of an imaginary ring-shaped area that is described by the periphery bit. The diameter of the hole (the drill diameter) drilled in the workpiece is determined by the radial distance between the center axis and a surface generating edge on the periphery bit.

Drills of the type in question are frequently available in sets that enable drilling of holes having different sizes, the individual set being based on use of one and the same type of center bit and periphery bit, respectively. For instance, an individual set may include a certain number of, e.g. 4–6, drills, having diameter differences of 1 mm, e.g. for drilling holes having 16 mm, 17 mm, 18 mm, 19 mm and 20 mm, respectively, diameter. In this connection, in order not to have to manufacture different types of bits, a manufacturing method is applied, according to which the different drills in a given set are given different active drill diameters by the fact that the periphery pockets, which all are similar in order to be able to receive one and the same type of bits, are placed differently far from the center axis of the drill.

A drawback of previously known manufacturing methods of the type mentioned above is that only the periphery bit, more precisely the pocket for this bit, is moved out with increasing drill diameter, but not the center pocket and the bit therein. This fact means that the relation between the effective cutting edge length of the center bit and the effective cutting edge length of the periphery bit will vary from drill to drill. The variation of the mutual relations between the two effective cutting edge lengths of the bits entails a plurality of disadvantages. Thus, one disadvantage is that the balance of the drill is negatively effected in the relative cutting edge length determining the forces that are applied to the shank via the two bits. Furthermore, the variation gives rise to unfavorable input or entering processes, among other things so far that the individual drill may enter the workpiece in a point that differs from the nominally intended, desired entering point. At four-edged bits, i.e., bits having four similar cutting edges, which enables four edges on one and the same bit to be indexed up to operative positions, there is furthermore a problem in previously known drills to protect the individual, inoperative surface-generating edge until the appurtenant cutting edge has been indexed up to an operative position.

OBJECTS AND FEATURES OF THE INVENTION

The present invention aims at obviating the above-mentioned disadvantages of drills or drilling tools manufactured in a batchwise manner, and at providing an improved drilling tool set. Therefore, a primary object of the invention is to provide a drilling tool set in which the effective cutting edge lengths of the different drills do not vary in such a way that they give rise to balancing and entering problems. An additional object is to provide a drilling tool set in which the center bits of the individual drilling tools in a simple and effective way protect each unused surface generating edge on the periphery bit.

SUMMARY OF THE INVENTION

According to the invention, at least the primary object is attained by a drilling tool set which comprises a plurality of drilling tools having different operative drill diameters to blast drill holes of different respective diameters. Each drilling tool of the set comprises a basic body defining a central axis of rotation, and two replaceable indexable bits including a center bit and a periphery bit which are mountable in respective center and periphery pockets formed in a front end of the basic body. The periphery bits of the respective drill tools of the set are identical, and the center bits of the respective drill tools of the set are identical. Each of the center and periphery pockets of each drill tool defines a radial center point. A first of the drill tools has a smaller operative drill diameter than a second of the drill tools. The first tool includes a first periphery pocket and a center pocket. The center point of the first periphery pocket is disposed closer to the axis than is the center point of the second periphery pocket. The center point of the first center pocket is disposed closer to the axis than is the center point of the second center pocket.

In a second aspect, the invention also relates to an improved drilling tool.

In a third aspect, the invention furthermore relates to an indexable drill bit, suited to be used in the drilling tool according to the invention.

As is seen in the appended detailed description, the invention is based on the intention to locate not only the periphery pockets of different drills in a given drill set at various distance from the center axis of the drill, but also the center pockets. In other words, the center pockets are moved after the periphery pockets approximately proportionally in relation to the "motion" of the periphery pockets. Thus, when a periphery bit at increasing drill diameter is moved out from the center axis (by the fact that the periphery pocket is located at a greater radial distance from the center axis in relation to the periphery pocket of the closest smaller drill), the center bit is also moved out, although a smaller distance from the center axis. Conversely, it is valid that the center pocket at decreasing drill diameter is moved proportionally inwards towards the center axis when the periphery pocket is moved inwards. In this way, the relative cutting edge lengths of the two bits are not altered in the same drastic way as when only the distance of the periphery bit from the center axis is altered according to prior art.

BRIEF DESCRIPTION OF THE DRAWINGS

The objects and advantages of the invention will become apparent from the following detailed description of preferred embodiments thereof in connection with the accompanying drawings and in which like numerals designate like elements.

DESCRIPTION OF PREFERRED EMBODIMENTS OF THE INVENTION

Figure 1:
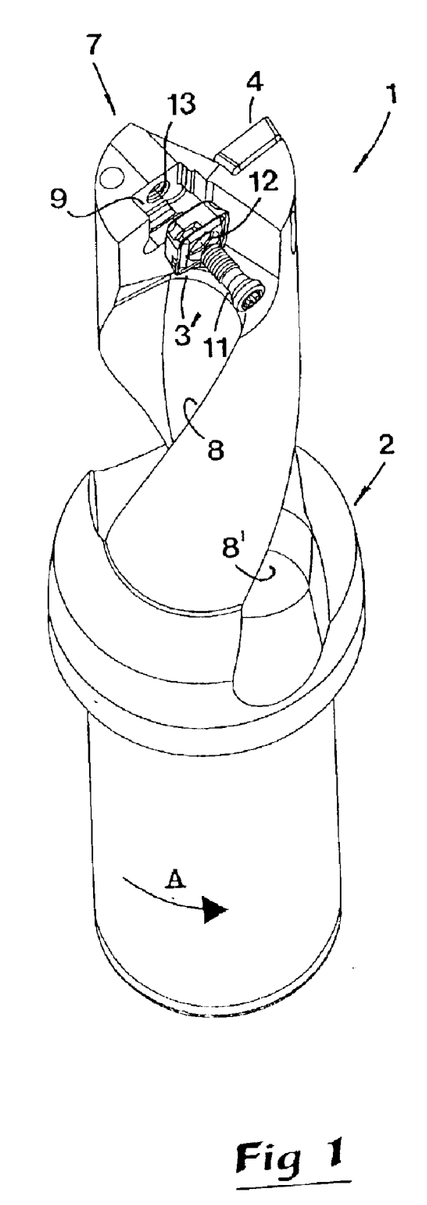
FIG. 1 is a first perspective view of a drill according to the invention, the drill being shown with the tip thereof turned upwards and the center bit thereof removed from the appurtenant pocket, while the periphery bit is shown in a mounted state.
Figure 2:
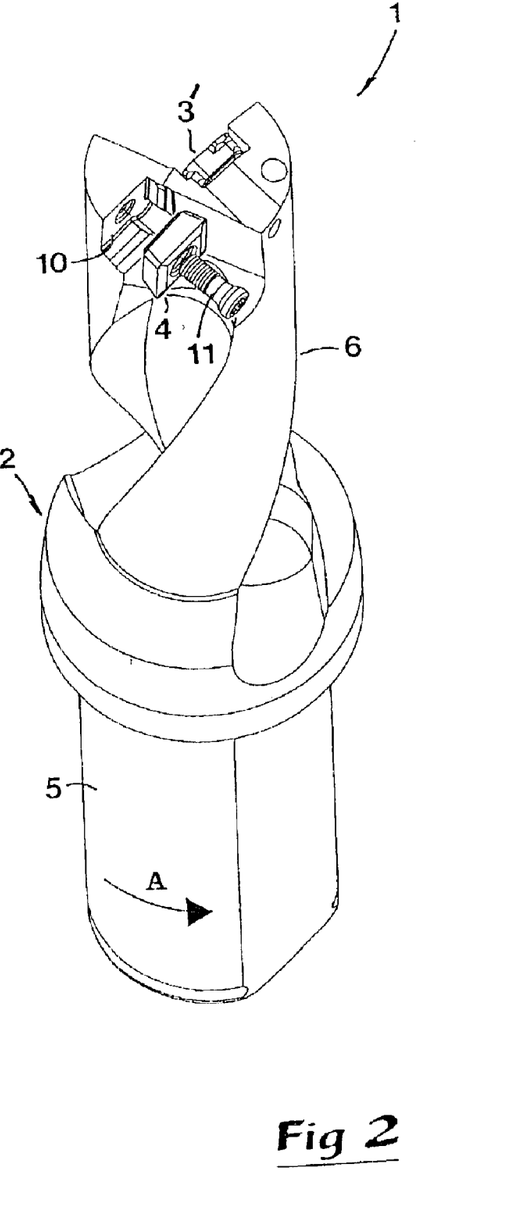
FIG. 2 is a second perspective view showing the periphery bit in a released state and the center bit in a mounted state.

In FIGS. 1 and 2, a tool in the form of a drill 1 is shown, which includes a basic body 2 as well as two bits (inserts) 3', 4. The basic body 2 is in the example formed with a rear fastening part 5 and a front, long narrow shank 6 of a cylindrical basic shape. The length of the shank 6 may vary most considerably. For the sake of clarity, the shank is shown with a limited length. From a front end or tip, designated 7, in which the bits 3', 4 are arranged, two chip channels 8, 8' extend, which advantageously are helicoidal. Adjacent to the front ends of these chip channels, pockets 9, 10 are formed for receipt of the bits 3', 4. More precisely, a center pocket 9 is located near the geometrical center axis of the drill for receipt of the bit 3', which forms a center bit. A periphery pocket 10 is located at a greater distance from the center axis of the drill, in order to receive the bit 4, which forms a periphery bit.

In FIGS. 1 and 2, the direction of rotation of the drill is indicated by means of the arrow A. It should also be mentioned that the bits 3', 4 in the example are fixed in appurtenant pockets by means of screws 11, which may be inserted through center holes 12 in the bits and tightened in threaded holes 13 in the drill tip 7.

Figure 3:
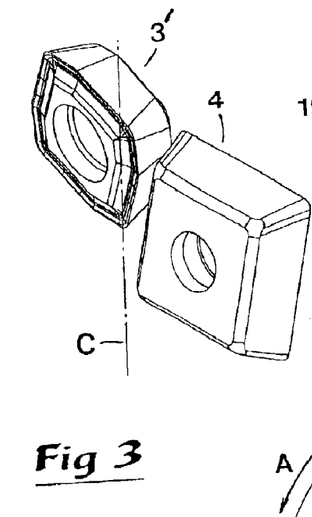
FIG. 3 is a perspective view of only the two bits of the drill, which are shown in connection with the geometrical center axis of the drill.

In FIG. 3, only the two bits 3', 4 and the positions thereof in relation to the center axis C of the drill are shown, i.e. the geometrical axis around which the drill rotates. In the same way as in FIGS. 1 and 2, the operative cutting edges of the bits are shown turned upwards in FIG. 3.

Figure 4:
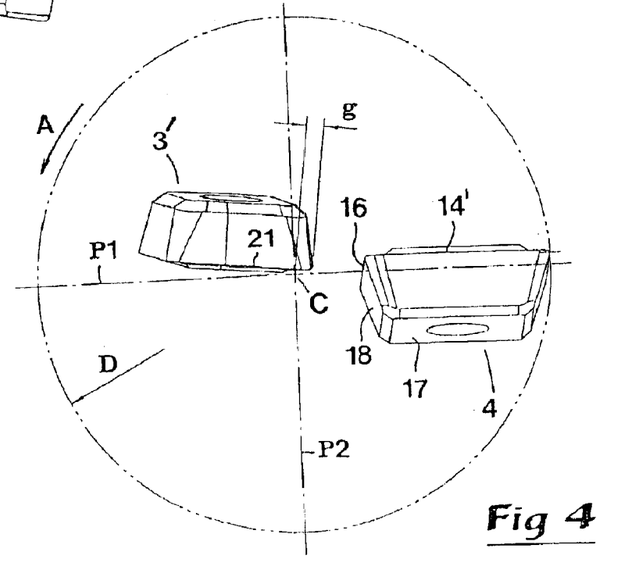
FIG. 4 is a schematic view illustrating the two bits, two geometrical diametrical planes intersecting each other as well as the bore diameter, being illustrated by dash-dotted lines.

In FIG. 4, the bits 3', 4 are shown inserted into a geometrical figure consisting of dash-dotted lines further explaining the geometrical location of the bits in relation to the center axis C. More precisely, FIG. 4 shows how the center axis C is intersected by two imaginary diametrical planes P1, P2 extending axially along the longitudinal direction of the drill and perpendicularly to each other. The operative cutting edge 14' of the periphery bit is approximately parallel to the plane P1. D designates the diameter of the drill, i.e., substantially corresponding to the diameter of a hole drilled in the workpiece, and which is determined by the radial distance between the center axis C and a radially outermost part of a cutting edge on the periphery bit 4. The bits 3' and 4 (and thereby the appurtenant pockets 9, 10) are separated from each other along the first diametrical plane P1. More precisely, the periphery bit 4 is entirely separated from the second diametrical plane P2, which intersects the center axis C, while the major part of the center bit 3' is situated on the opposite side of the diametrical plane P2. However, a minor portion (see the measurement g) of the center bit 3' intersects the plane P2 involving that a short, inner portion of the operative cutting edge of the center bit intersects the diametrical plane P2. It should also be noted that the radially outer part of the center bit 3' is situated at a considerable radial distance from the hole circle H. However, the width and position of the bits are such that the operating ranges of the bits overlap each other during rotation of the drill. It should also be noted that the center bit 3' is positioned behind the diametrical plane P1 with reference to the direction of rotation A. Furthermore, the center bit 3' is generally inclined in relation to the plane P1 as viewed along the axis (FIG. 4), more precisely in such a way that the operative cutting edge of the bit is inclined at a certain, moderate angle to the plane P1. However, an analogous, operative cutting edge on the periphery bit 4 is in the preferred embodiment located in front of the diametrical plane P1, with reference to the direction of rotation.

In the shown, preferred embodiment example, the center bit 3' as well as the periphery bit 4 are four-edged, i.e. each has four similar cutting edges, which gradually may be indexed up to operative positions by turning the bits 90°.

Figure 5:
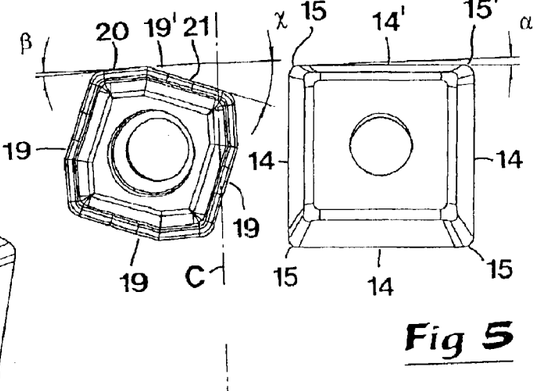
FIG. 5 is a side view of only the two bits, which are placed in the same way as the bits according to FIG. 4 in relation to the geometrical center axis of the drill.

The individual periphery bit 4 consists of a single, square-shaped bit having four cutting edges, three of which are always in inactive or inoperative positions and designated 14 in FIG. 5, while the fourth cutting edge is in an operative position and designated 14'. Between said edges, rounded corners extend, three of which are inactive and designated 15, while a fourth corner 15' is operative and partly forms a surface-generating edge. The bit 4 has a top side or front side 16, a bottom side or back side 17 as well as four perimeter side surfaces 18 (which in the example extend at an obtuse angle to the bottom side 17 in order to form a bit having a positive cutting geometry). The operative cutting edge 14' extends at a certain, moderate angle α to an imaginary cross plane extending perpendicular to the center axis C, as shown in FIG. 5. The angle α may in practice be within the range of 1–4°, suitably 2–3°. Hence, it axiomatically follows that the outer, inoperative cutting edge 14 extending axially rearwards from the corner edge 15' forms an equal clearance angle of α relative to a plane parallel to the axis C.

Also the center bit 3' includes four similar major cutting edges, three of which are inoperative and designated 19, while the fourth is operative and designated 19'. Contrary to the individual cutting edge 14 of the periphery bit 4, the individual cutting edge 19 of the center bit is divided into two part edges 20, 21 extending at an obtuse angle to each other, with the part edge 20 disposed axially forwardly of the part edge 21 (see FIG. 5). More precisely, a first, relatively short part edge 20 is oriented at an angle β to an imaginary cross plane extending perpendicular to the center axis C. In practice, said angle β may amount to about 2°. The second, somewhat longer part edge 21 is oriented at an angle χ to the same cross plane. According to the invention, the angle χ should amount to at least 15° and at most 30°, suitably at least 20° and at most 25°. In the example according to FIG. 5, the angle χ amounts to about 20°. This means that the angle between the part edge 21 and the center axis C or the diametrical plane P2 should amount to at least 60° and at most 75°, preferably at least 65° and at most 70°.

As is seen in FIGS. 4 and 5, the part edge 21 intersects the diametrical plane P2, i.e. an inner portion of the part edge 21 extends past the center axis C (to the right in the drawing). The fact that the inner portion of the operative cutting edge in this way protrudes past the center axis without the portion in question being caught in the workpiece is possible as a consequence of the fact that the angle χ, which is at least 15°, guarantees that the protruding portion sufficiently falls away enough rearwards in relation to the feeding of the drill.

Figure 6:
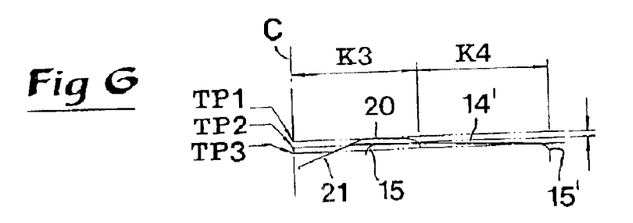
FIG. 6 is a schematic and hypothetical view, illustrating the two bits of the drill on one and the same side (to the right) of the center axis of the drill, the periphery bit being shown closer to the observer than the center bit.
Figure 7:
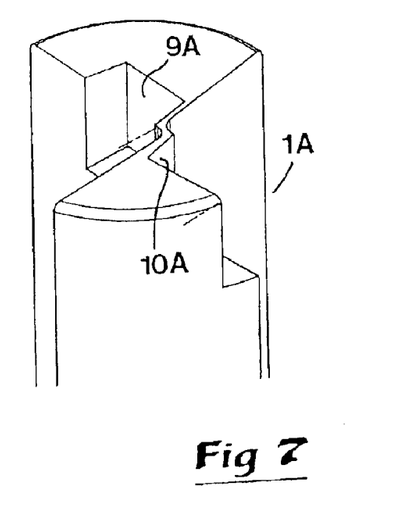
FIG. 7 is a partial, simplified perspective view showing the center and periphery pockets on the tip of a first drill in a drill set.

In FIG. 6, TP1, TP2 and TP3 designates three different axially spaced imaginary cross planes extending perpendicularly to the center axis C, with the plane TP1 being the most axially forward of the planes. An axially front portion on the part edge 20 is positioned in the first cross plane TP1. In an analogous way, an axially front portion of the operative cutting edge 14' of the periphery bit 4 is positioned in the cross plane TP2. The axially rearmost cross plane TP3 intersects the second part edge 21 approximately at the middle of the same. Thus, in FIG. 6, it is illustrated how the cutting edges of the two bits 3', 4 enter the workpiece in three different steps. In a first step, the first part edge 20 of the center bit cuts into the material. In a second step, the part of the cutting edge 14' of the periphery bit that is situated outside the center bit cuts into the material. Only in a third step, the second part edge 21 of the center bit cuts into the material.

In FIG. 6, the effective cutting edge lengths of the two bits 3', 4 are furthermore illustrated. More precisely, the effective radial cutting edge length of the center bit is designated K3, while the effective radial cutting edge length of the periphery bit 4 is designated K4. As is clearly seen in FIG. 6, the cutting edge length K4 is determined by the radial distance between: (i) the radially outermost part of the edge 15' and (ii) the radially outer rounded corner on the part edge 20 of the center bit. In this connection, it should also be pointed out that the inactive corner edge 15 (located to the left of the active corner in FIG. 5) on the periphery bit is located in a protected position behind the portion on the center bit that includes the part edge 20, as is evident from FIG. 6.

Figure 8:
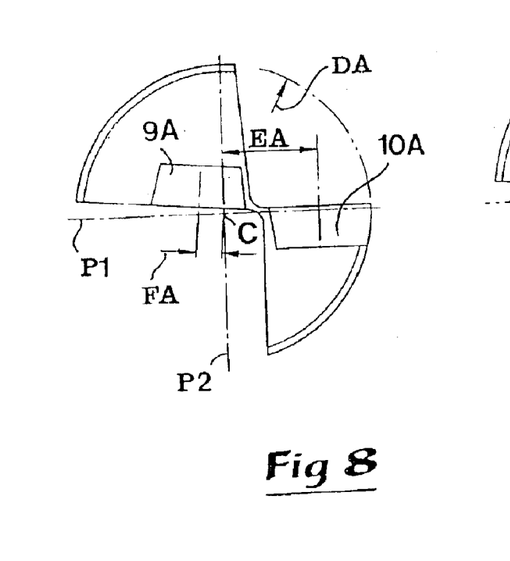
FIG. 8 is an end view of the drill according to FIG. 7.
Figure 9:
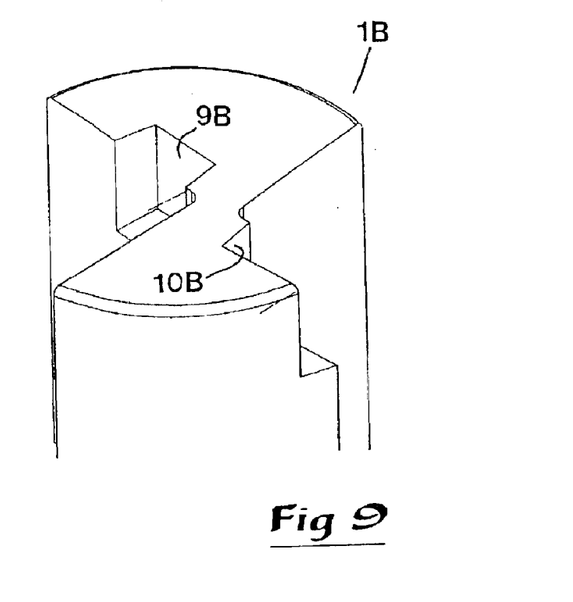
FIG. 9 is a perspective view corresponding to FIG. 7 showing the bit pockets on a second drill manufactured with larger diameter in the same set as the drill according to FIGS. 7 and 8.
Figure 10:
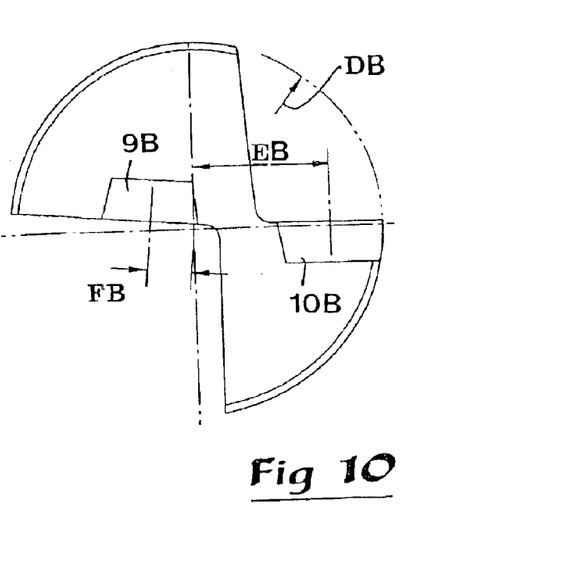
FIG. 10 is an end view of the drill according to FIG. 9.

Reference is now made to FIGS. 7–10, which illustrate the basic idea of the invention. Thus, in FIGS. 7 and 8, a first drill 1A having two bit pockets 9A and 10A, respectively, is shown. This drill, more precisely the shank of the drill, has a diameter that is designated DA. In FIGS. 9 and 10, a second drill 1B is shown that is included in the same drill set as the drill 1A, but that has a larger diameter DB. Also in this drill 1B, a center pocket 9B and a periphery pocket 10B are of the same type as the pockets in the drill 1A in respect of size and shape. In this way, similar center bits 3' may be applied in the center pockets 9A, 9B of the two drills, as well as similar periphery bits may be applied in the pockets 10A, 10B of the two drills.

In FIG. 8, EA designates the radial distance between the center C (or radial plane P2) of the drill and a geometric center of the periphery pocket 10A in a direction parallel to the plane P1, while FA designates the radial distance between the center of the drill and the geometric center of the center pocket 9A. The corresponding radial measurements for the bit pockets 9B and 10B on the drill 1B are designated EB and FB, respectively.

Below, a specific embodiment example follows, according to which the drill 1A has a diameter of DA=20 mm and the drill 1B has a diameter of DB=25 mm. The radial distance EA between the periphery pocket 10A and the center C of the drill 1A then amounts to 6.49 mm, while the radial distance FA between the center pocket 9A and the center C of the drill amounts to 1.75 mm. Thus, the radial distance difference between the centers of the two bit pockets is 6.49−1.75=4.74 mm.

In the 25 mm drill 1B, the radial distance EB between the periphery pocket 10B and the center of the drill amounts to 8.99 mm, while the distance FB between the center pocket 9B and the center of the drill amounts to 3.00 mm. In other words, the radial distance difference between the centers of the two bit pockets is 8.99−3.00=5.99 mm.

By locating, in accordance with the invention, not only the periphery pockets of different drills at various distances from the drill center, but also the center pockets, an optimum adaptation of the cutting edge lengths of the two bits is obtained so far that the effective cutting edge length of the center bit in a drill having a small diameter becomes comparatively small, while the effective cutting edge length of the center bit in a drill having a larger diameter—at which the center bit has been "moved out" from the center—becomes proportionally larger. It has turned out that the ideal cutting edge lengths K3 and K4, respectively, of the respective bits are obtained if the ratio between: (i) the radial distance difference between the two bit pockets in two basic bodies following each other dimension-wise in the drill set, and (ii) the radial distance difference between the center axis and the periphery pocket of the basic body of the same basic bodies, is within certain limits. Thus, said ratio should amount to at least 0.4 and at most 0.6. In the example described above, said ratio amounts to (5.99−4.74)/(8.99−6.49)=0.5.

In contrast in the prior art drill set, the center pockets of all of the drill tools of the set would be disposed at the same distance from the axis, so the above-described ratio for the prior art would be (7.24−4.74)/(8.99−6.49)=1.0.

Figure 11:
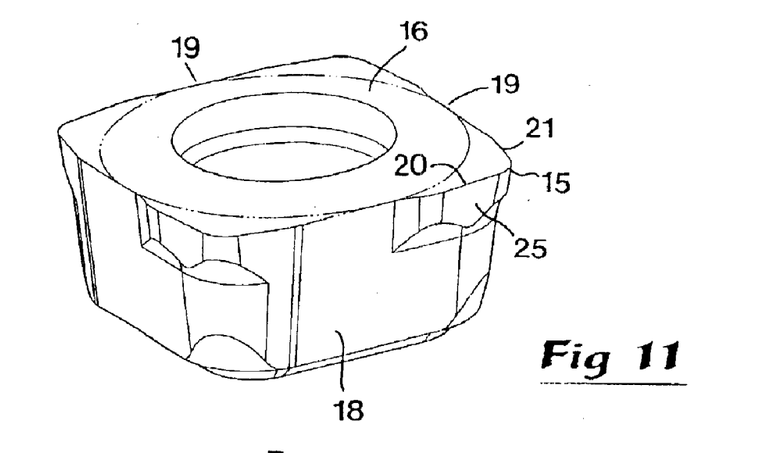
FIG. 11 is a perspective view of a preferred embodiment of a center bit according to the invention.
Figure 12:
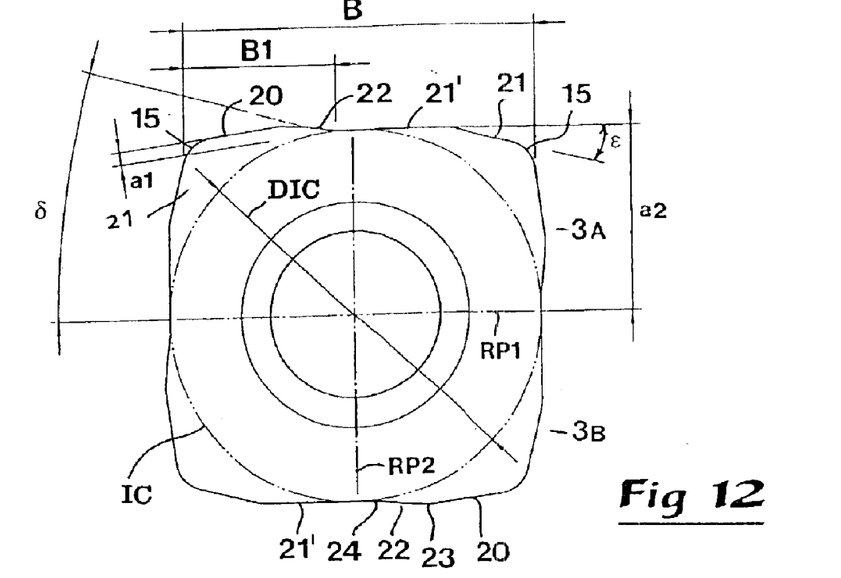
FIG. 12 is a planar view from above of the bit according to FIG. 11.
Figure 13:
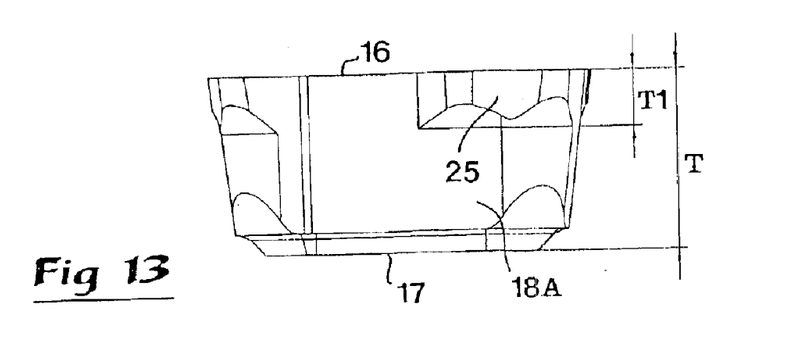
FIG. 13 is a side view of the bit according to FIGS. 11 and 12.

Reference is now made to FIGS. 11–13, which illustrate a preferred embodiment of a drill bit 3 according to the invention. Said bit may advantageously be used as a center bit in the drills in question. The bit is of a quadrangular basic shape and includes four similar cutting edges, generally designated 19. Each individual cutting edge 19 is situated in the area between a top side 16 and an individual side surface 18, which extends between the top side and the area of a plane bottom side 17. Four corners of the cutting edges 19 are designated 15. In the example, the top side 16 of the bit is illustrated in the shape of a plane surface. However, in practice, said top side may be formed with highly varying topography and, among other things, include chip breakers of different types.

In contrast to the center bit 3' according to FIGS. 3–5, the bit 3 according to FIGS. 11–13 is formed so that each major cutting edge 19 includes three part edges, viz. a first part edge 20, a second part edge 21 as well as a third part edge 21', which is spaced apart from the first part edge 20 via a transition portion 22. An inscribed circle, designated IC, can be inscribed which is tangent to all of the part edges 21' of the four cutting edges. In said inscribed circle, the diameter of which is designated DIC, two diametrical planes, RP1 and RP2, respectively, serving as reference planes can be drawn, each of which extends parallel to two opposing ones of the part edges 21'. Each such imaginary reference plane divides the bit into two halves, which are mirror-invertedly symmetrical in an inverse state. Thus, the reference plane RP1 separates a first half 3A from a second half 3B in FIG. 12. If one of these halves 3A, 3B would be hypothetically inverted, i.e. swung about the line RP2 as an axis (whereupon the right and left sides of the half change places), the two halves would become mirror-invertedly symmetrical.

As is clearly seen in FIG. 12, at least a portion of the first part edge 20 is located at a larger distance from the reference plane RPI than the third part edge 21'. Therefore, if the bit according to FIG. 12 were to enter a workpiece (not shown) positioned above the drawing figure, the part edge 20 would come into engagement with the workpiece before the part edge 21'. The transition portion 22 between the part edges 20, 21' is defined by a convex curve 23 (see the bottom of FIG. 12), adjacent to the first part edge 20 as well as a concave curve 24, adjacent to the part edge 21'. In this connection, a conceived or actual, straight tangent line extends between the curves 23, 24 at a certain angle δ (see to the left in FIG. 12) to the reference plane RP1 (and the reference plane RP2, respectively). Said angle δ should amount to at least 10° and at most 30°, preferably at least 13° and at most 25°. In the shown example, the angle δ is approx. 15°.

Via the transition edge portion 22, a radial distance difference al is provided between the first part edge 20 and the inscribed circle IC. In practice, said distance difference should amount to at least 2% and at most 15%, preferably at most 5% of the diameter DIC of the inscribed circle. The distance between the reference plane PP1 and the part edge 21 which is parallel to the plane RP1 is designated a2. This measurement a2 equals the radius of the inscribed circle.

The angle ε between the part edge 21 and an imaginary extension of the part edge 21' may vary most considerably, but should amount to at least 1° and at most 30°, preferably at least 10° and at most 20°. In the example, the angle ε amounts to about 16°. While simultaneously referring to FIGS. 5 and 12, it should be pointed out that the broken part edge 21 is intended to protrude past the center axis C (and intersect the plane P2). In the bit according to FIGS. 11–13, the part edge 21 is inclined at the same angle ε as the angle χ in FIG. 5, i.e. ε=χ.

As is seen in FIGS. 11 and 13, the first part edge 20 of a given cutting edge 19 and a second part edge 21 of a nearby cutting edge 19 is formed on a common, bracket-like projection 25, the thickness T1 of which is smaller than the total thickness T of the bit. Therefore, in the area under the projection or shoulder 25, a part support surface 18A is left, which extends from the main support surface formed by the side surface 18 extending from the top side 16 of the bit to the area of the bottom side 17 of the bit. By the fact that the part edges 20, 21 are formed on a projection having a limited thickness—contrary to a projection extending all the way from the top side to the area of the bottom side—a substantially L-shaped support surface having an optimum area is obtained. The thickness T1 should amount to 25–40% of the total thickness T of the bit. In the example, the thickness T1 amounts to approx. 33% of the total thickness T. Thus, along considerably more than half of the height of the bit, a lower support surface extends along the major part of the width of the bit.

In this connection, it should also be mentioned that the individual part edge 20, 21, 21' either may be straight, as is shown in FIGS. 11–13, or slightly arched with at least partially convex or concave basic shape. For instance, the part edge 20 may be of a convex basic shape and the part edge 21' of concave basic shape, and the part edge 21 may be convex.

In FIG. 12, B designates the length between two corners 15 of the cutting edge 19. The measurement B1 designates the total length of the part edge 20 and the transition portion 22, such as said length is counted from a corner 15 to the point where the transition portion 22 transforms into the part edge 21'. As is visible for the naked eye in FIG. 9, the measurement B1 is less than half of the measurement B. In the example, B1 amounts to 43% of B. In practice, the length B1 should amount to at least 10% and at most 60%, suitably at least 20% and at most 50%, of the length B, in order to protect, along a radial distance of corresponding length, an inner and front, inoperative corner edge of the periphery cutting edge, which corner follows on rotation of the drill.

Figure 14:
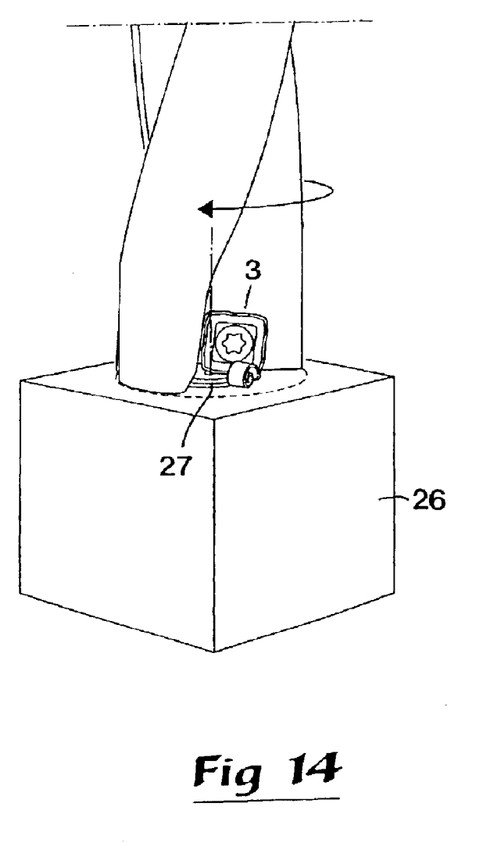
FIG. 14 is a simplified perspective view illustrating how the center bit of the drill partially enters a workpiece in an initial stage of the entire entering phase of the drill.
Figure 15:
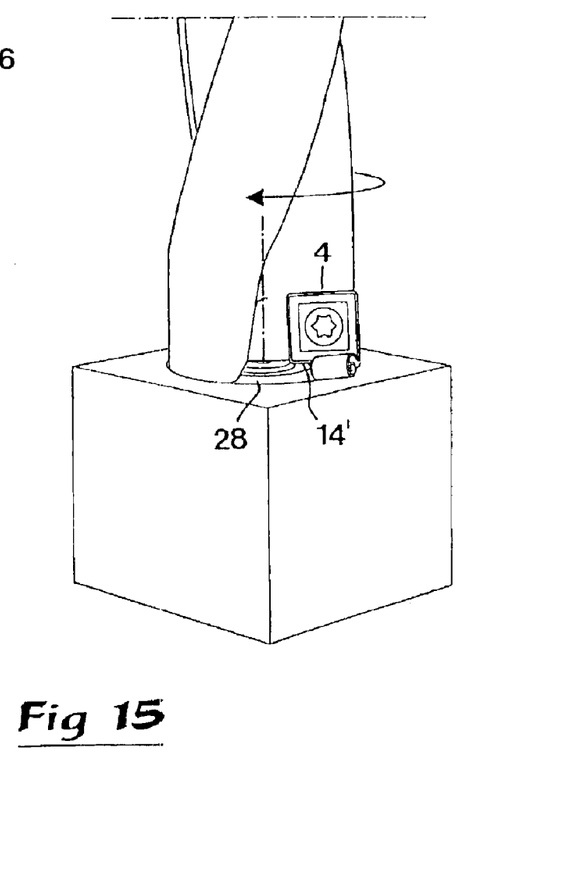
FIG. 15 is a perspective view corresponding to FIG. 14, showing how the periphery bit—following further rotation of the drill—has commenced the entering thereof of the workpiece.

Reference is now made to FIG. 14, which illustrates a center bit 3 during initial entering of a workpiece 26 as well as to FIG. 15, which shows a periphery bit 4, likewise during initial entering of the workpiece. As has been described above in connection with FIG. 6, the entering of the workpiece of the two bits 3, 4 takes place in several different steps. In the first step, which is shown in FIG. 14, the first part edge 20 of the operative cutting edge of the center bit 3 has commenced the separation of a chip while forming a groove 27 in the workpiece. Said groove is radially distanced from the center axis of the drill, so far that the part edge 20 is distanced from the drill center. In the next step, which is shown in FIG. 15, the periphery bit 4 has, following further rotation of the drill, commenced its entering of the workpiece. By the fact that the active cuffing edge 14' of the periphery bit 4 is somewhat inclined (see the angle α in FIG. 5), the radially inner corner thereof will initially be housed in the recessed groove 27, and then the radially outer part of the cutting edge 14' will successively commence recession of a second groove 28 in the workpiece. Following further rotation and simultaneous axial feeding of the drill, also the second part edge 21 (or the part edges 21, 21') of the center bit 3 cuts into the material (this step is not shown in FIG. 14 or 15), the two bits entering the workpiece completely. When the operative cutting edge of the center bit in its entirety has cut into the material, a chip that is continuous in respect of width, but not in length, is separated, in that the transition edge portion 22, as a consequence of the chosen angle δ, forms a gentle or flat transition between the part edges 20, 21'.

Although the present invention has been described in connection with preferred embodiments thereof, it will be appreciated by those skilled in the art that additions, modifications, substitutions and deletions not specifically described made be made without departing from the spirit and scope of the invention as defined in the appended claims.

What is claimed is:

1. Drilling tool set comprising a plurality of drilling tools having different operative drill diameters to blast drill holes of different respective diameters, each drilling tool of the set comprising a basic body defining a central axis of rotation, and two replaceable indexable bits including a center bit and a periphery bit which are mountable in respective center and periphery pockets formed in a front end of the basic body, the periphery bits of the respective drill tools of the set being identical, and the center bits of the respective drill tools of the set being identical; each of the center and periphery pockets of each drill tool defining a radial center point; a first of the drill tools having a smaller operative drill diameter than a second of the drill tools; the first tool including a first periphery pocket and a first center pocket; the second tool including a second periphery pocket and a second center pocket; the center point of the first periphery pocket disposed closer to the axis than is the center point of the second periphery pocket; the center point of the first center pocket disposed closer to the axis than is the center point of the second center pocket.

2. The drilling tool set according to claim 1 wherein a difference between the radial distances of the centers of the peripheral and center pockets of the first drill tool constitutes a first value; a difference between the radial distance of the centers of the peripheral and center pockets of the second drill tool constitutes a second value; the radial distance of the center of the peripheral pocket of the first drill tool from the axis constitutes a third value; the radial distance of the center of the center pocket of the second drill tool from the axis constitutes a fourth value; a value A equals the second value minus the first value; and a value B equals the fourth value minus the third value; a ratio of A to B is at least 0.4 and no greater than 0.5.

3. A drilling tool comprising a basic body defining a center axis, the body having a center insert pocket and a peripheral insert pocket formed in a front end thereof; and two chip channels extending from respective ones of the pockets; a peripheral cutting bit insert and a center cutting bit mounted in the peripheral pocket and the center pocket, respectively; the peripheral bit and its respective pocket being separated from the center bit and its respective pocket along a first plane containing the center axis and disposed substantially parallel to an active cutting edge of the peripheral bit, the center bit including an active cutting edge comprised of radially inner and outer portions, wherein the radially outer portion is disposed axially forwardly of the radially inner portion and is of shorter length than the radially inner portion, the radially inner portion being intersected by a second plane containing the center axis and oriented perpendicularly to the first plane, the intersection forming an angle of at least 60° and no more than 75° as viewed in a direction perpendicular to the first plane.

4. The drilling tool according to claim 3 wherein the angle is at least 65° and no greater than 70°.

5. The drilling tool according to claim 3 wherein the center bit has four cutting edges having the same shape, each such cutting edge including first and second part edges spaced apart by a transition edge portion; each such cutting edge, when in an active position, having the first part edge thereof disposed axially ahead of the second part edge; an axially forward portion of the first part edge being touched by a first cross plane (TP1) oriented perpendicular to the axis; the second part edge being touched by a second cross plane (TP3) oriented perpendicularly to the axis; the first part edge disposed axially forwardly with reference to the second part edge; the periphery bit including a third cross plane (TP2) extending perpendicularly to the axis and touching an axially forward portion of the active cutting edge of the periphery cutting edge; the first plane (TP1) disposed axially ahead of the second plane (TP3), and the third plane (TP2) disposed between the first and second planes.

6. The drilling tool according to claim 5 wherein the first part edge and the transaction edge portion together form a length of at least 10% and no more than 60% of a total length of the cutting edge.

7. The drilling tool according to claim 6 wherein the length is at least 20% and no greater than 50% of a total length of the cutting edge.

8. The drilling tool according to claim 5, wherein the cutting edges on the center bit are tangent to an imaginary circle having a diametrical plane defining a reference plane, extending parallel to a second part edge of the active cutting edge, the reference plane dividing the bit into two halves that are mirror-invertedly symmetrical in an inverse state; the two part edges of each cutting edge of the center bit transforming into each other via a transition edge portion defined by a convex curve adjacent to the first part edge and a concave curve adjacent to the second part edge; a straight line disposed tangent to both the convex and concave curves forming at an angle of at least 10° and at most 30° to the reference plane.

9. The drilling tool according to claim 8, wherein a distance difference between the inscribed circle and the first part edge being at least 2% and at most 15% of a diameter of the inscribed circle.

10. The drilling tool according to claim 9 wherein the distance difference is at most 5% of the diameter of the inscribed circle.

11. The drilling tool according to claim 3, wherein the part edge that intersects said second diametrical plane at an angle of at least 60° and at most 75° comprises a third part edge which extends at a greater angle to the reference plane than a nearby part edge.

12. The drilling tool according to claim 3, wherein the first part edge of each individual cutting edge of the center bit is formed on a bracket-like projection having a thickness smaller than a thickness of the bit, in order to provide a support surface between the projection and a bottom side of the bit, which support surface extends adjacent to the second part edge.

13. Indexable drill bit having a quadrangular basic shape and four similar cutting edges, wherein each of the cutting edges comprises first and second part edges transforming into each other via a transition edge portion, the four cutting edges being tangent to an inscribed circle having a diametrical plane defining a reference plane extending parallel to a second part edge and dividing the bit into two mirror-image halves; the first part edge being at least partially positioned at a greater distance from said reference plane than the second part edge; the transition edge portion defined by a convex curve adjacent to the first part edge as well as a concave curve adjacent to the second part edge, a straight line disposed tangent to both of those curves forming an angle of at least 10° and at most 30° to the reference plane.

14. The drill bit according to claim 13 wherein a distance between the inscribed circle and the first part edge amounts to at least 2% and at most 15% of the diameter of the inscribed circle.

15. The drill bit according to claim 14 wherein the distance is at most 5% of the diameter of the inscribed circle.

16. The drill bit according to claim 13 wherein each individual cutting edge includes a third part edge which extends from a respective second part edge and forms an angle greater than zero therewith.

17. The drill bit according to claim 13 wherein the first part edge is formed on a bracket-like projection having a thickness smaller than a thickness of the bit in order to provide a support surface between the projection and a bottom side of the bit, which support surface defines an extension of a side surface of the bit.

\* \* \* \* \*